United States Patent [19]

Amery et al.

[11] E Re. 31,326

[45] Reissued Jul. 26, 1983

[54] SIGNAL TRANSLATING APPARATUS FOR COMPOSITE SIGNAL SUBJECT TO JITTER

[75] Inventors: John G. Amery, Quincy, Ill.; Robert W. Jorgenson, Pasco, Wash.

[73] Assignee: RCA Corporation, New York, N.Y.

[21] Appl. No.: 779,009

[22] Filed: Mar. 18, 1977

Related U.S. Patent Documents

Reissue of:

[64] Patent No.: 3,872,497
Issued: Mar. 18, 1975
Appl. No.: 351,036
Filed: Apr. 13, 1973

[51] Int. Cl.[3] ..... H04N 9/12

[52] U.S. Cl. ..... 358/322; 358/31; 358/326

[58] Field of Search ..... 358/4, 11, 21, 8, 31

[56] References Cited

U.S. PATENT DOCUMENTS

| | | | |
|---|---|---|---|
| 2,729,698 | 1/1956 | Fredendall | 178/5.4 R |
| 3,619,491 | 11/1971 | Fujita | 178/5.4 CD |
| 3,700,793 | 10/1972 | Borsuk et al. | 178/5.2 R |
| 3,961,359 | 6/1976 | Okuno | 358/8 |

*Primary Examiner*—Joseph A. Orsino, Jr.

*Attorney, Agent, or Firm*—E. M. Whitacre; J. S. Tripoli; W. H. Meagher

[57] ABSTRACT

Circuits are disclosed for processing color encoded video signals, encoded per a format wherein a chrominance signal in the form of a modulated subcarrier is buried in spectrum "troughs" in the midband of a wider band luminance signal, an illustrative use of the encoding format being in video disc recording. The processing circuits serve, in use with composite signals developed during video disc playback, to convert an input composite signal of buried subcarrier format to an output composite signal of NTSC format. Comb filtering is employed to separate buried subcarrier chrominance signal from midband luminance signal components. A heterodyning step preceding comb filtering is performed in a manner substantially precluding "jitter" of played back signals from disturbing accuracy of comb filter separating action, enabling use of a single 1H delay line form for the comb filter and enabling use of a relatively inexpensive, narrowband structure for the single delay line. The comb filter output provides a chrominance signal in a band suitable for output composite signal use. The output chrominance signal is also used in a subtractive process to effect comb filtering of the luminance signal to remove therefrom midband chrominance signals.

16 Claims, 3 Drawing Figures

SIGNAL TRANSLATING APPARATUS FOR COMPOSITE SIGNAL SUBJECT TO JITTER

Matter enclosed in heavy brackets [ ] appears in the original patent but forms no part of this reissue specification; matter printed in italics indicates the additions made by reissue.

The present invention relates generally to color image signal processing circuits, and particularly to processing circuits suitable for converting an input composite signal of one encoding format (used, for example, in a video disc recording) to an output composite signal of another encoding format (useful, for example, for application to a color television receiver).

In British Provisional application No. 18036/72, filed Apr. 19, 1972 for Dalton H. Pritchard (and in the subsequent copending U.S. Pat. application of Pritchard, Ser. No. 350,777, entitled "COLOR INFORMATION TRANSLATING SYSTEM" and filed concurrently herewith), a color encoding format is disclosed wherein a chrominance signal in the form of a modulated subcarrier is "buried" in the midband of a wider band luminance signal. Comb filtering of the luminance signal. midband prepares troughs in the luminance signal frequency spectrum. The chrominance signal is subject to complementary comb filtering to confine it to components falling in the vacated troughs of the luminance signal frequency spectrum. An illustrative use of this encoding format is in video disc recording. The copending U.S. Pat. application, Ser. No. 126,772, filed Mar. 22, 1971 for John K. Clemens, now U.S. Pat. No. 3,842,194 and entitled "INFORMATION RECORDS AND RECORDING/PLAYBACK SYSTEMS THEREFOR," describes a variable capacitance video disc system which is illustrative of disc systems in which the buried subcarrier encoding format may be advantageously employed.

In one contemplated form of player apparatus for a video disc record, the player apparatus does not incorporate image display equipment but rather serves as a form of attachment or auxiliary equipment for use with a separate color television receiver (the image display equipment of the latter serving for display of the recorded color image information). In such a player attachment, it is desirable that an output composite signal be developed that appears in the format (e.g., the NTSC format) which the color television receiver is designed to handle. Thus, for player attachments usable with video disc records employing the buried subcarrier format, it is desirable to provide the player with means for converting an input composite signal of buried subcarrier format to an output composite signal of a different encoding format (e.g., NTSC format) compatible with the color television receiver processing circuitry design. Of course, such conversion apparatus may also be desirably employed in other forms of video disc player apparatus, such as one of the combination type, where a single unit incorporates both color video disc playing equipment and broadcast color television receiving equipment and the economy inhering in use of common color decoding equipment for both disc and broadcast signals dictates the desirability of disc signal conversion.

In the aforesaid Pritchard applications, it is noted that in video disc playback operations, one may encounter, for a variety of reasons, undesired variations of the speed of relative motion between the pickup stylus and the record groove that may result in spurious variations of the recovered signal frequencies. Thus, for example, the color subcarrier sideband frequencies in a recovered composite signal of the "buried subcarrier" type may be subject to "jitter" about their otherwise expected locations in the frequency spectrum, with the accompanying luminance signal component frequency locations subject to a similar jitter.

The aforesaid jitter of signal frequencies recovered in disc playback poses a problem for one seeking to transcode the recovered signals from buried subcarrier format to another format compatible with color television receiver circuitry. While comb filtering of the midband portion of the recovered signals may permit accurate separation of the interleaved luminance and chrominance signal components when the frequency stability of the recovered signals is assured, the presence of "jitter" can jeopardize attainment of the requisite accuracy of separation. The Pritchard applications propose the use of comb filters of a form employing two 1H delay lines (the two 1H delay line form providing a "comb" characteristic with broader rejection notches than is obtainable with a one 1H delay line form) as one manner of rendering luminance-chrominance signal separation in the player less sensitive to "jitter" of recovered signal frequencies.

Pursuant to the principles of the present invention, however, a solution to the jitter sensitivity problems is provided wherein the expense of including two 1H delay lines in the player apparatus may be conveniently avoided. Pursuant to such principles, heterodyning of the recovered buried subcarrier composite signal (or a portion thereof) with local oscillations precedes comb filtering; and, the source of local oscillations is caused to have substantially the same "jitter" as the recovered signal components (e.g., by rendering the local oscillation source responsive to the frequency variations suffered by the color synchronizing component which accompanies the buried subcarrier chrominance signal). The product of heterodyning with such local oscillations is substantially jitter-free; comb filtering of the product may be carried out with a single 1H delay line form of comb filter with crosstalk freedom relatively independent of the original "jitter".

By appropriate choice of the nominal frequency of the local oscillations, the heterodyning step that effects jitter stabilization may also serve to shift the chrominance signal from its midband location in the input (buried subcarrier) format to the highband location desired for the output (e.g., NTSC) format, whereby subsequent comb filtering (in the highband spectral region) to eliminate luminance signal components provides a highband chrominance signal for direct inclusion in an output composite signal.

In accordance with illustrative embodiments of the present invention, a subtractive process is employed for comb filtering of the luminance signal to eliminate the shared band chrominance signal components. In the subtractive process, the output of a chrominance comb filter (providing chrominance signal components to the exclusion of luminance signal components) is subtracted from an uncombed composite signal to provide a luminance signal free of chrominance signal components. The subtractive process may conveniently be carried out with the uncombed composite signal, as well as the comb filter output to be subtracted therefrom, in a frequency shifted condition produced by the aforesaid heterodyning step, pursuant to a preferred embodiment. Return of the luminance signal components to a baseband location, after elimination of the chrominance signal components by the subtraction technique, is effected in said embodiment through use of an envelope detector and output low pass filter. Pursuant to an alternative approach, the subtractive process is carried out at baseband frequencies, using an uncombed version of the input composite signal (by-passed around the aforementioned heterodyning apparatus), with the comb filter output shifted back to a midband location, by a second heterodyning with the local oscillations, prior to use for the noted subtraction.

The nature of the circuit arrangements of the above-discussed invention embodiments permit the use of bandpass filtering to limit the bandwidth of the signal portion subject to comb filtering to the bandwidth of the shared band (i.e., the bandwidth of the recorded chrominance signal, which may illustratively be approximately 1 MHz.). Thus, practice of the present invention requires use of but one 1H delay line for the transcoder comb filter, and this 1H delay line need only handle a relatively narrow bandwidth centered about the color subcarrier frequency desired for the output composite signal (e.g., the NTSC color subcarrier frequency of approximately 3.58 MHz.). Relatively inexpensive 1H delay lines (e.g., Amperex Type DL45) are commercially available which may readily meet the resultant delay line passband requirements (e.g., 3.58 MHz.±500 KHz.).

Objects and advantages of the present invention will be readily recognized by those skilled in the art upon a reading of the following detailed description and an inspection of the accompanying drawings in which.

Figure 1:
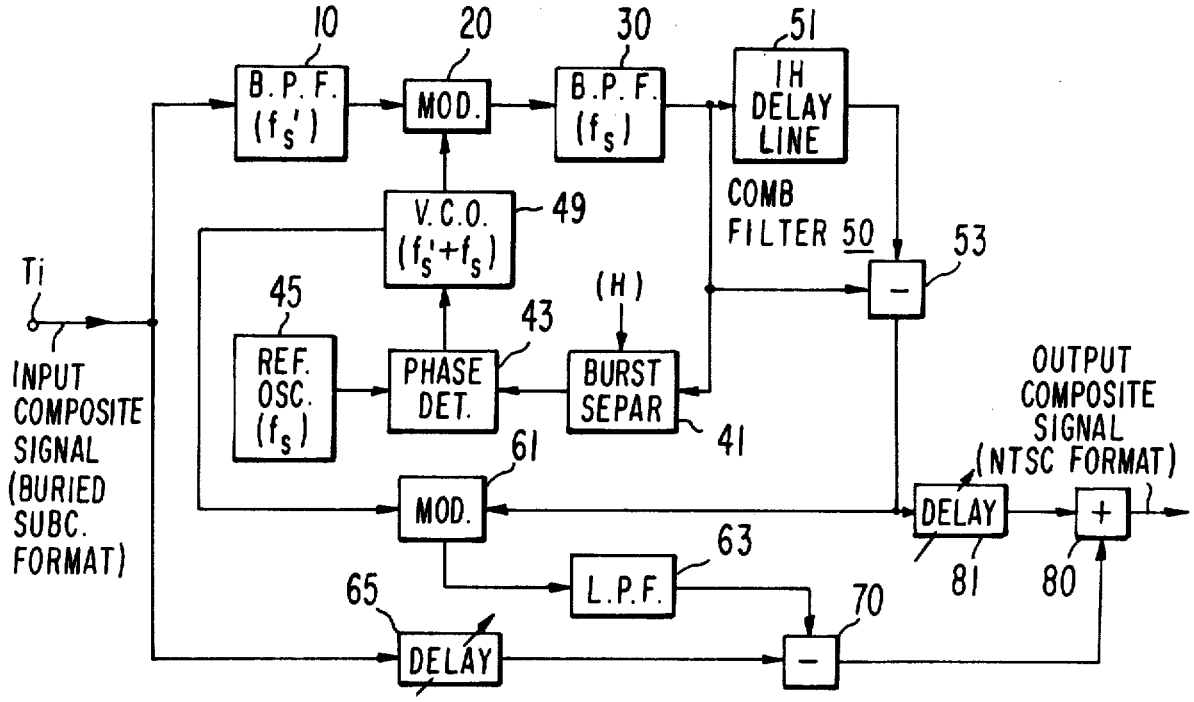
FIG. 1 illustrates, in block diagram representation, transcoding apparatus embodying principles of the present invention, the apparatus being suitable for video disc player use in transcoding signals from a buried subcarrier form to the general form of an NTSC encoded signal.

In the FIG. 1 arrangement, an input composite signal in buried subcarrier format appears at input terminal Ti. For purposes of illustration, the following parameters (found to be particularly suitable for video disc use) may be assumed to be descriptive of the intended buried subcarrier form of input signal: (1) Color subcarrier frequency ($f_s'$): $195/2 f_H$, or approximately 1.53 MHz., when the line frequency ($f_H$) corresponds to the U.S. standard for color television broadcasting; (2) Chrominance signal: sum of respective quadrature related subcarrier phases respectively amplitude modulated with red and blue color difference signals (R-Y, B-Y) of 0–500 KHz bandwidth, with equal bandwidth (500 KHz.) upper and lower sidebands preserved (and carrier suppressed); (3) Luminance signal (Y) bandwidth: 0 to 3 MHz.; (4) Color synchronizing component: burst of oscillations at buried subcarrier frequency ($f_2'$) of reference phase and amplitude, during horizontal blanking "backporch" (corresponding to standard NTSC color synchronizing component in all but frequency). The input composite signal thus includes lowband (0 to 1 MHz.) and highband (2–3 MHz.) spectral portions subject to occupancy only by luminance signal components, and a midband spectral portion (1–2 MHz.) subject to sharing by luminance and chrominance signal components. (If suitable comb filtering is employed in the formation of the buried subcarrier signal, as explained more fully in the aforesaid Pritchard applications, the respective luminance and chrominance signal components will appear in the shared midband in substantially non-overlapping, interleaved relationship.)

The input composite signal at terminal $T_i$ is applied to a bandpass filter 10 having a passband centered about the buried subcarrier frequency ($f_s'$), and a bandwidth (e.g., $f_s' \pm 500$ KHz.) suitable for selectively passing the shared midband portion of the input composite signal, to the exclusion of the luminance-only lowband and highband portions. The output of band pass filter 10 is applied to a modulator 20 (preferably of doubly balanced form) for heterodyning with oscillations supplied by a voltage controlled oscillator (VCO) 49. The output of oscillator 49 is nominally at a frequency corresponding to the sum of the buried subcarrier frequency ($f_s'$) and the desired output subcarrier frequency ($f_s$). It may be assumed, for purposes of the current illustrative example, that the desired output subcarrier frequency is the NTSC subcarrier frequency of $455/2\ f_H$, or approximately 3.58 MHz., wherefore the sum frequency is approximately 5.11 MHz. The oscillator output frequency is, however, subject to variations about the nominal 5.11 MHz. frequency for previously mentioned jitter stabilization purposes; the manner in which such variations are effected will be explained subsequently.

The difference frequency product of modulation in the output of modulator 20 is selected by a bandpass filter 30 having a passband centered about the desired output subcarrier frequency ($f_s$) and a bandwidth (e.g., $f_s \pm 500$ KHz.) encompassing the band now occupied by a frequency shifted version of the input chrominance signal. The output of bandpass filter 30 thus includes chrominance information in a frequency band (e.g., 3–4 MHz.), and appearing as modulation of a color subcarrier at a frequency (e.g., 3.58 MHz.), appropriate for application to NTSC color television receiver circuitry. Also included in the output of bandpass filter 30, however, are midband luminance signal components shifted upward in frequency by the heterodyning action of modulator 20 to occupy in interleaved fashion the same band (3–4 MHz) as the frequency shifted chrominance signal.

The output of bandpass filter 30 is applied to a comb filter 50 having a multiplicity of pass bands centered about odd integral multiples of half the line frequency ($f_H$), and intervening nulls at frequencies corresponding to integral multiples of the line frequency. Illustratively, the comb filter 50 is formed by a single 1H delay line 51 of the aforementioned DL45 type responding to the output of bandpass filter 30 and supplying an output (delayed by a time interval corresponding to $1/f_H$) to a signal combiner 53 for subtractive combination with the delay line input. The function of comb filter 50 is to reject the frequency shifted midband luminance signal components while passing the frequency shifted chrominance signal. This function can be well performed by a comb filter of the indicated type if the signal component frequencies of the input composite signal at terminal $T_i$ are indeed those intended by choice of the buried subcarrier system parameters.

However, where the source of the input composite signal is a video disc player, for example, various practical playback conditions (e.g., undesired variations of turntable rotational speed, record eccentricity, record warp, etc.) may unfortunately cause "jitter" of the input component fequencies about their otherwise expected locations in the frequency spectrum. If the "jitter" of the input component frequencies is retained in the frequency shifted signal portion applied to comb filter 50, performance of the desired separating function thereby may be adversely affected; e.g., luminance signal component frequencies intended to be rejected may be mismatched with the nulls of the comb filter 50, effectively riding up the steep slopes of the rejection notches of the response characteristic of this single 1H delay line form of comb filter. To reduce such adverse effects of input signal jitter, a control of the output of oscillator 49 is effected, using a type of phase locked loop (PLL) system now to be described.

The output of bandpass filter 30 is applied to a burst separator 41, which is gated by a suitably timed line frequency pulse (H) derived from the input composite signal to selectively pass the output of filter 30 appearing during the back porch interval occupied by the color synchronizing component. The output of burst separator 41 comprises periodic bursts of oscillations which will nominally be at the output (NTSC) subcarrier frequency, the input synchronizing bursts having been shifted to that frequency (3.58 MHz.) by the heterodyning action of modulator 20.

The burst separator output is applied to a phase detector 43 for phase comparison with the output of a reference oscillator 45. Oscillator 45 is a highly stable oscillator (illustratively, a crystal controlled oscillator) operating at the desired output subcarrier frequency ($f_s$). The output of phase detector 43 is a control voltage applied to adjust the frequency of operation of the voltage controlled oscillator 49 in a correcting direction. A closed loop system is thus formed which functions to hold the synchronizing burst component of the output of band pass filter 30 in frequency (and phase) synchronism with the highly stable output of reference oscillator 45. As jitter of the input composite signal occurs, tending to cause a departure from such synchronism, the control voltage output of phase detector 43 produces a compensating adjustment of the output of VCO 49 to oppose such departure. Since the jitter of the burst component of the input composite signal, (arising for example, from the noted playback operation causes) tends to match the jitter of the accompanying chrominance and luminance components, the indicated control of VCO 49 tends to remove the jitter of these components as well. With proper choice of the PLL system parameters to accommodate the range of jitter variations reasonably to be expected, the output of bandpass filter 30 is sufficiently jitter-free to readily permit use of the economical single 1H delay line form of comb filter described for use in FIG. 1.

The output of comb filter 50 comprises a chrominance signal (substantially free of luminance signal components) in a form suitable for use in forming an output composite signal. In addition to being used for that purpose (in circuitry to be subsequently described), the output of comb filter 50 is additionally employed for the purpose of obtaining a combed luminance signal by a subtractive process. For this purpose, the output of comb filter 50 is applied to a modulator 61 for heterodyning with an output of VCO 49. The difference frequency product of modulation in the output of modulator 61 (preferably of doubly balanced form) is selectively passed by a low pass filter 63.

The output of low pass filter 63 comprises a combed chrominance signal, returned by the heterodyning action of modulator 61 to its original midband location. The combed chrominance signal output of low pass filter 63 is applied to a signal combiner 70 for subtractive combination with an uncombed version of the input composite signal to effect cancellation of the midband chrominance signal component of the composite signal. The uncombed composite signal is applied to combiner 70 from input terminal $T_i$ via a delay element 65. The purpose of the delay element 65 is to provide the composite signal with a delay substantially matched to the delay suffered by the cancelling chrominance components in traversing filters 10, 30 and 63. The delay element 65 may desirably be adjustable (as indicated by the arrow designation in the drawing) to facilitate the delay matching requisite for optimum cancellation results; the combiner 70 may also desirably incorporate means for amplitude adjustment of one or both of its inputs to facilitate the amplitude matching requisite for optimum cancellation results.

With the proper degree of delay and amplitude matching effected, the output of combiner 70 comprises a wideband luminance signal substantially free of chrominance signal components, the buried subcarrier sideband components having been combed from its midband portion by cancellation action in combiner 70. It will be noted that the desired cancelling action can still be obtained in combiner 70 in the presence of jitter of the composite signal input, since the second heterodyning with the frequency varying output of VCO 49 in modulator 61 converts the combed chrominance signal to a "jittering" condition appropriate for achieving the cancellation.

The luminance signal output of combiner 70 is applied to a signal combiner 80 for addition to the combed chrominance signal output of comb filter 50 to form the desired output composite signal. Application of the comb filter output to combiner 80 is effected via an additional delay element 81, adjusted to bring the comb filter output in step with the luminance signal output of combiner 70 (the additional delay required substantially corresponding to that associated with signal traversal of low pass filter 63).

The output composite signal provided by combiner 80 is in the general form of an NTSC signal, including a wideband luminance signal and a highband chrominance signal in the form of sidebands of a subcarrier at the NTSC color subcarrier frequency, suitable for processing by the circuitry of a conventional NTSC broadcast color television receiver. For the illustrative example presented herein, the output composite signal includes a luminance signal extending from 0 to 3 MHz. approximately, and a chrominance signal occupying a band extending approximately from 3 to 4 MHz. While such a composite signal provides less information than is provided by a composite color television signal broadcast in accordance with U.S. broadcast standards, the absence of such information as is conveyed by luminance signal components above 3 MHz. and color sideband frequencies in the range of 2–3 of MHz. is readily tolerable for disc image display purposes (particularly when it is noted that the typical commercially produced U.S. color television receiver makes little or no use of such components of broadcast signals).

Figure 2:
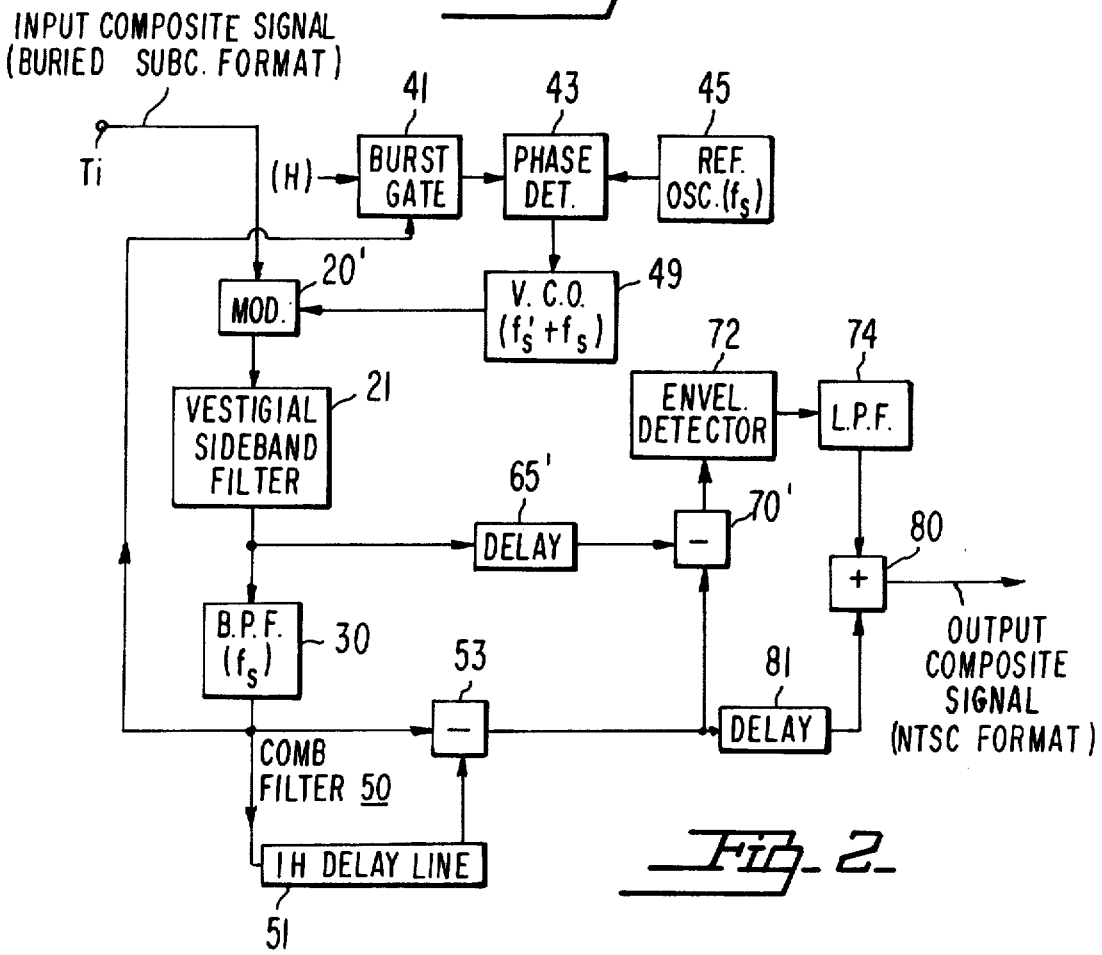
FIG. 2 illustrates, in block diagram representation, a modification of the transcoding apparatus of FIG. 1 pursuant to a further embodiment of the present invention.

In the FIG. 1 arrangement, as previously described, a subtractive process is used to effect the desired combing of the luminance signal, with the subtraction being carried out at baseband frequencies, the latter feature requiring the down-shifting in frequency of the combed chrominance signal prior to its application to the subtractor. FIG. 2 illustrates a modification of the FIG. 1 arrangement in which a subtractive process again is used to effect the desired combing of the luminance signal, but with the subtraction carried out in the frequency band occupied by the combed chrominance signal itself (thus requiring no frequency shifting of the combed chrominance signal prior to its subtraction use).

In the modified arrangement of FIG. 2, the input composite signal appearing at terminal $T_i$ is applied in full to modulator 20', which is also responsive to a carrier input (nominally of $f_s+f_s$ frequency) from VCO 49. The modulator 20' is of singly balanced form, balanced against the composite video input but not against the $(f_s'+f_s)$ carrier input from VCO 49. A vestigial sideband filter 21, coupled to the output of modulator 20', passes the unbalanced carrier and the lower sideband thereof. In the lower sideband (comprising the difference frequency products of modulation), the color subcarrier falls at the frequency $f_s$ desired for output composite signal use. The bandpass characteristic of filter 21 places the $(f_s'+f_s)$ carrier at the midpoint of the high end slope such that a small portion of the upper sideband is also passed. The percentage of modulation of the $(f_s'+f_s)$ carrier effected in modulator 20' is held to a relatively low value (e.g., 20 percent) by suitable relation of the input levels.

Bandpass filter 30, coupled to the output of filter 21, functions as in FIG. 1 to limit the input to comb filter 50 to the shared band about $f_s$. Burst gate 41 (responding to the output of bandpass filter 30) provides a synchronizing burst input to phase detector 43 for phase comparison with the $f_s$ output of reference oscillation 45, as in FIG. 1. The phase detector output provides an appropriate variation of the output frequency of VCO 49 to stabilize the sideband frequencies in the modulator output against "jitter", as previously explained.

The frequency shifted chrominance signal appears in the output of comb filter 50 combed free of the shared band luminance signal components that fall in the multiple rejection notches of the comb filter. The combed signal is applied to signal combiner 70' for subtractive combination with the output of vestigial sideband filter 21. The latter signal is applied to combiner 70' via a delay element 65' (providing a delay substantially matching the delay suffered by signals passing through filter 30).

With proper matching of delay (and chrominance component amplitude) for the two inputs, the output of subtractive combiner 70' comprises luminance information combed free of the chrominance signal components. The combed luminance signal, however, appears as sideband information of the modulated $(f_s'+f_s)$ carrier, and must be returned to baseband. This is accomplished by applying the output of combiner 70' to an envelope detector 72, and selecting the baseband component of the detector output with a low pass filter 74.

The output of low pass filter 74 comprises a baseband luminance signal free of buried subcarrier chrominance components, and is applied to signal combiner 80 for addition to the combed chrominance signal output of comb filter 50. The latter signal is applied to the combiner 80 via a delay element 81 (substantially matching the delay suffered by signals passing through low pass filter 74) to properly align the luminance and chrominance components of the output composite signal formed by combiner 80.

Figure 3:
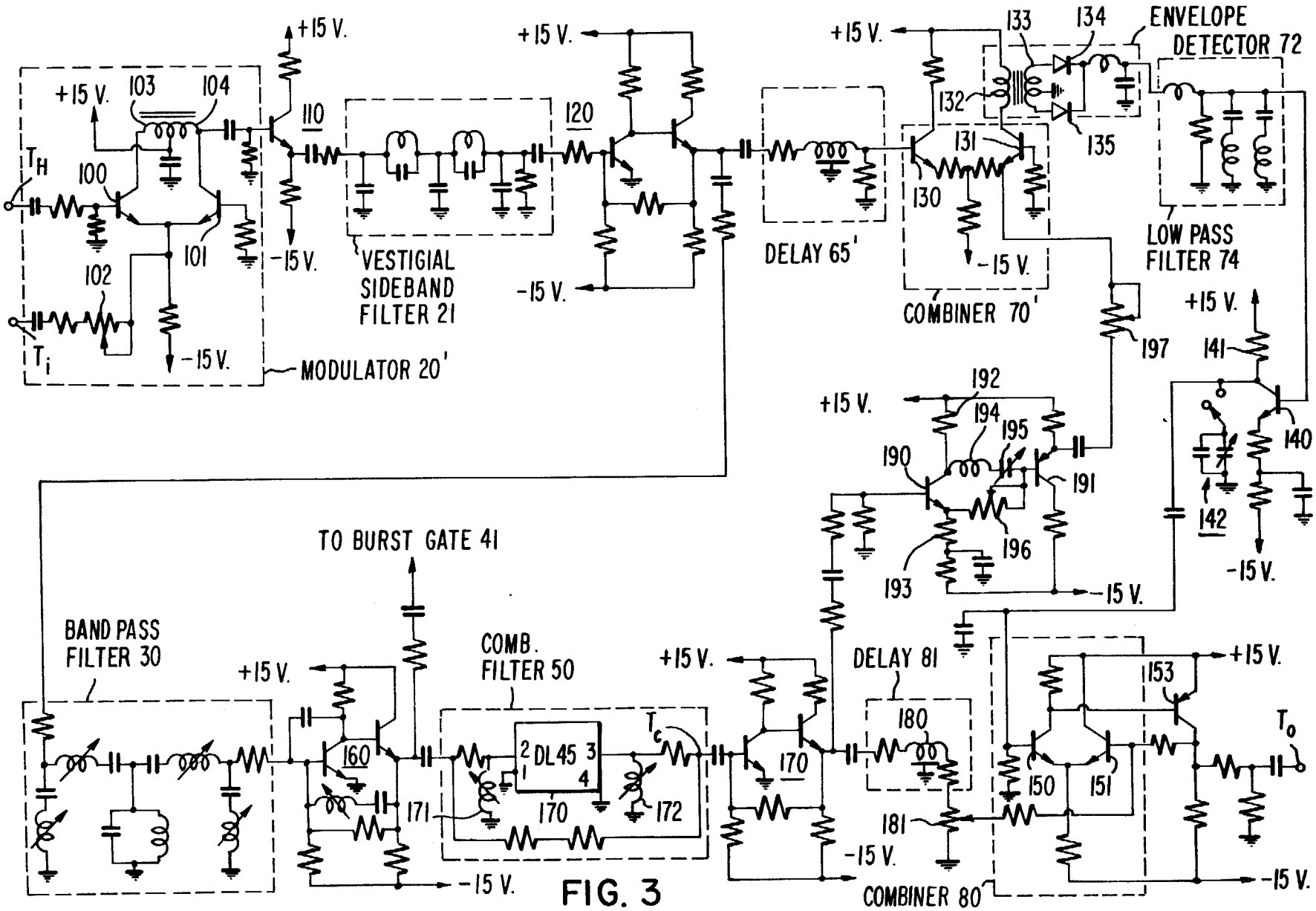
FIG. 3 illustrates, in schematic detail, an example of transcoding apparatus of the form generally shown in FIG. 2.

FIG. 3 illustrates the schematic details of an illustrative working embodiment of the invention conforming to the general arrangement of FIG. 2.

The modulator 20' of FIG. 3 employs a pair of NPN transistors 100, 101 as the active devices thereof. The input composite video signal from input terminal $T_i$ is applied, via a path including a variable resistor 102 (serving a video input level adjusting function) to the joined emitters of transistors 100 and 101. 5.11 MHz oscillations (from VCO 49, FIG. 2) appear at the carrier input terminal $T_H$ and are applied to the base of transistor 100; the base of transistor 101 is returned to ground via a resistor. A pair of closely coupled coils 103, 104 (illustratively bifilar wound on a toroidal core) provide the collector loads for transistors 100, 101. The bifilar winding interconnections are such that the modulator output appearing at the collector of transistor 101 is balanced against the video input (but unbalanced with respect to the carrier input).

The modulator output is coupled via an emitter follower stage 110 to the vestigial sideband filter 21 (formed in conventional manner of reactive components of appropriate value). The output of filter 21 is applied to the input of an amplifier 120, including a grounded-emitter input stage and a grounded-collector output stage. The grounded-collector stage provides a low impedance source for driving delay unit 65', illustratively incorporating a coaxial delay line of appropriate length, and including terminating resistors of appropriate value for surge impedance matching.

The output of delay unit 65' provides the wideband input for combiner 70' which includes transistor 130 (in grounded-collector configuration) driving transistor 131 (in grounded-base configuration). In addition to the wideband input, which is applied to the base of transitor 130, combiner 70' receives (at the emitter of transistor 131) a combed chrominance signal from circuitry to be subsequently described.

The output of combiner 70' appears across a transformer primary winding 132 in the collector circuit of transistor 131, and is coupled via the transformer secondary winding 133 (centertap grounded) to a pair of diodes 134, 135, connected (in envelope detector 72) to provide full wave recetification of the modulated carrier input. The detector output appearing across the detector load capacitor is applied to a low pass filter 74 (including series resonant traps to strongly attenuate the carrier fundamental and second harmonic components in the detector output).

The output of filter 74 is applied to an amplifier transistor 140 having a collector load resistor 141, across which a variable capacitance network 142 may be selectably connected. Where preemphasis of video signals has been employed in the encoding operation (e.g., at the disc recorder) including of network 142 provides a facility for introducing a compensating deemphasis of the luminance signal.

The collector output of transistor 141 is coupled to the base of transistor 150, arranged with transistor 151 as an emitter-coupled pair, in combiner 80. The other input to combiner 80 comprises chrominance signals (supplied by circuitry to be subsequently explained) which appear at the base of transistor 151. The composite signal output of combiner 80 is derived from the collector of transistor 150 and applied to the base of an output transistor (PNP transistor 153), having a collector output circuit, to which the output terminal $T_o$ is coupled.

To complete the description of the FIG. 3 arrangement, attention is now directed to the chrominance signal processing circuits. The output of amplifier of 120, in addition to driving the aforesaid delay unit 65, is applied via a band pass filter 30 of conventional design to an amplifier 160, having a grounded-emitter input stage and a grounded-collector output stage, the latter providing signals for application to burst gate 41 (FIG. 2) for PLL purposes, and also supplying the input to comb filter 50.

Comb filter 50 includes a 1H delay line of the aforementioned DL 45 type, with input supplied to terminal 2 thereof and output (inverted) derived from terminal 4 thereof. Shunt inductors 171 and 173 at the respective terminals provide trimming adjustments of the line's characteristic. Signals from the respective input and output terminals are combined by a resistive adding network at terminal $T_c$. The combed chrominance signal at terminal $T_c$ is applied to an amplifier 170, having a grounded-emitter input stage and a grounded-collector output stage. The latter stage provides a low impedance source for driving delay unit 81, similar to the above-described delay unit 65', but having a potentiometer 181 in series with the output terminating resistor of the coaxial delay line (180) to provide an output chrominance signal level adjusting facility. The adjustable tap of potentiometer 181 is coupled to the base of transistor 151 to supply the chrominance input for combiner 80.

The combed chrominance signal at the output of amplifier 170 is applied to the base of a phase splitter transistor 190, having equal valued collector and emitter load resistors, 192 and 193, respectively. A network, comprising inductor 194, variable capacitor 195, and variable resistor 196 in series, is coupled between the collector and emitter electrodes of transistor 190. The function of the phase splitter stage, with the noted adjustable network, is to provide a delay trimming facility which may be adjusted for optimum chrominance component cancellation (in combiner 70'). With the series resonance frequency for inductor 194 and capacitor 195 chosen to be above the highest input component frequency, and with the resistance value resistor chosen to establish the resonance Q at a value approximately equal to one, the network will provide a linear phase, constant envelope delay characteristic over the range of input component frequencies. By adjusting the value of variable capacitor 195, the amount of delay may be varied. A concomitant adjustment of the variable resistor 196 is desirable to hold the desired Q level.

The trimmer circuit output, taken at the junction of capacitor 195 and resistor 196, is applied to an emitter-follower transistor 191. The emitter of transistor 191 is coupled via a variable resistor 197 to the emitter of transistor 130 to supply the combed chrominance signal input to combiner 70'. Variable resistor 197 provides a facility for adjusting the level of this input to the value required for optimum chrominance signal cancellation in combiner 70'.

What is claimed is:

1. A color image signal translating system comprising, in combination:

means for providing an input composite signal including (a) a signal representative of the chrominance of a color image and occupying only a given frequency band, and (b) a signal representative of the luminance of said color image and including a first luminance signal portion occupying said given frequency band and additional luminance signal portions having frequencies outside said given frequency band; said first luminance signal portion including signal components normally subject to occupancy of only a first plurality of regularly spaced spectral locations extending over said given frequency band, and said chrominance signal including signal components normally subject to occupancy of only a second plurality of spectral locations interleaved with said first plurality; said composite signal providing means being subject to abnormal operation causing spurious variations of the frequencies of said signal components about said normally occupied spectral locations;

a source of oscillations means for varying the frequency of the oscillations provided by said source about a nominal value in synchronism with said spurious variations during abnormal operation of said composite signal providing means;

means for heterodyning oscillations provided by said source with at least the portion of said composite signal occupying said given frequency band;

means for deriving an output from said heterodyning means inclusive of a frequency shifted chrominance signal occupying a frequency band different from said given frequency band, and a frequency shifted luminance signal portion corresponding to said first luminance signal portion and sharing said different frequency band;

and a comb filter responsive to said output derived from said heterodyning means for passing said frequency shifted chrominance signal to the substantial exclusion of said frequency shifted luminance signal portion.

2. Apparatus in accordance with claim 1 also including:

means for utilizing the signals passed by said comb filter to derive from said composite signal a signal output inclusive of said luminance signal to the substantial exclusion of said chrominance signal.

3. Apparatus in accordance with claim 2 also including:

means for combining the signal output derived by said signal utilizing means with the signals passed by said comb filter to form an output composite signal having a chrominance signal occupying said different frequency band.

4. Apparatus in accordance with claim 3 wherein said comb filter includes a delay line having a passband encompassing said different frequency band and of a narrower bandwidth than the bandwidth of said luminance signal.

5. Apparatus in accordance with claim 1 wherein the frequency response characteristic of said comb filter exhibits a multiplicity of nulls at a third plurality of regularly spaced spectral locations in said different frequency band differing from said nominal value of oscillation frequency by respective frequency values corresponding to said first plurality of spectral locations.

6. In a color image signal translating system comprising a source of an input composite signal including a luminance signal occupying a wide band of frequencies, and a chrominance signal occupying only an intermediate portion of said wide band, the combination comprising:

a voltage controlled oscillator having an output of a frequency determined by a control voltage input;

means for modulating the output of said oscillator with said input composite signal to develop a modulated carrier output having a sideband in which said chrominance signal occupies an intermediate portion;

a comb filter having a single 1H delay line, and means for subtractively combining the input and output of said delay line, the passband of said delay line encompassing only a portion of said sideband inclusive of said intermediate portion;

means for applying said modulated carrier output to the input of said comb filter, said applying means having a passband encompassing said intermediate portion of said sideband to the exclusion of the remainder of said sideband;

chrominance signal utilization means responsive to the output of said comb filter; and means for rendering the control voltage input to said oscillator responsive to spurious variations of input composite signal frequencies.

7. Apparatus in accordance with claim 6 wherein said chrominance signal utilization means includes means for subtracting the output of said comb filter from said modulated carrier output to provide a combed version of said sideband, and detecting means responsive to the output of said subtracting means for deriving from said combed sideband an output signal inclusive of said luminance signal to the substantial exclusion of said chrominance signal.

8. Apparatus in accordance with claim 7 also including means combining the output of said comb filter with the output of said detecting means to form an output composite signal.

9. In combination with playback apparatus for deriving from a video disc record a composite video signal including a luminance signal occupying a wide band of frequencies, and a chrominance signal occupying only an intermediate portion of side wide band, a signal translating system comprising:

a voltage controlled oscillator having an output of a frequency determined by a control voltage input;

means for rendering the control voltage input to said oscillator responsive to spurious frequency variations of said chrominance signal;

means for modulating the output of said oscillator with said composite signal to develop a modulated carrier output having a sideband in which a frequency shifted version of said chrominance signal, substantially free of said spurious frequency variations, occupies an intermediate portion; said intermediate portion of said sideband lying above said wideband;

a 1H delay line responsive to the output of said modulating means, the passband of said delay line encompassing only a portion of said sideband inclusive of said intermediate portion;

first comb filter means, including a signal combiner responsive to the input and the output of said delay line, for passing said frequency shifted version of said chrominance signal to the substantial exclusion of luminance signal components;

means for developing from said composite signal a wideband output signal occupying said wide band of frequencies, and comprising luminance signal components to the substantial exclusion of chrominance signal components; and means for combining the wideband output signal of said developing means with the frequency shifted version of said chrominance signal passed by said first comb filter means to form an output composite signal having luminance and chrominance signals in respective non-overlapping frequency bands.

10. Apparatus in accordance with claim 9 wherein said wideband output signal developing means includes:

means for heterodyning the output of said oscillator with said output of said first comb filter means; and second comb filter means, including means for subtracting an output of said heterodyning means from the composite signal derived from said record, for passing luminance signal components to the substantial exclusion of chrominance signal components.

11. Apparatus in accordance with claim 9 wherein said chrominance derived from said video disc record includes a modulated color subcarrier accompanied by a color synchronizing component comprising period bursts of subcarrier oscillations, and wherein said means for rendering the control voltage input to said oscillator responsive to spurious frequency variations of said chrominance signal responds to a frequency shifted version of said subcarrier oscillations bursts derived from an output of said modulating means.

12. Apparatus in accordance with claim 1 also including:

means for developing from said input composite signal a wideband output signal occupying a wide band of frequencies encompassing said given frequency band, and including said first luminance signal portion and said additional luminance portions to the substantial exclusion of chrominance signal components; and means for combining said wideband output signal with the frequency shifted chrominance signal output of said comb filter to form an output composite signal.

13. Apparatus in accordance with claim 12 wherein said comb filter includes a single 1H delay line having a passband narrower than said wide band and lying above said wide band; and wherein said wideband output signal developing means includes a second comb filter utilizing said single 1H delay line to reject said chrominance signal components.

14. Apparatus in accordance with claim 13 wherein said second comb filter includes:

means for heterodyning the output of said source of oscillations with the frequency shifted chrominance signal output of said first-named comb filter; and means for subtracting an output of said heterodyning means from said input composite signal.

15. Apparatus in accordance with claim 13 wherein said second comb filter passes said frequency shifted luminance signal portion to the substantial exclusion of said frequency shifted chrominance signal, and wherein said wideband output signal developing means also includes frequency shifting means responsive to the output of said second comb filter for returning said frequency shifted luminance signal portion to said given frequency band.

*16. A video processing system comprising:*

*a. a source of a color television signal of the form obtained by colorplexing a frequency shifted chrominance signal shifted to a lower frequency band with a luminance signal by using frequency interlacement;*

*b. an extracting means for extracting a signal in the lower frequency shifted chrominance signal band from said color television signal and providing the extracted signal at its output;*

*c. a first frequency conversion means having an output terminal for frequency converting the extracted signal in the lower frequency shifted chrominance signal band into a first signal in the chrominance signal band of a standard color television signal;*

*d. a first separating means connected to the output terminal of said first frequency conversion means for separating the chrominance signal from said first signal, said first separating means including a first comb filter including a oneline delay element and providing the separated chrominance signal at its output;*

*e. a second frequency conversion means for frequency converting the chrominance signal separated by said first separating means to the frequency band of said lower frequency shifted chrominance signal band;*

*f. an adding means for adding the output of said second frequency conversion means to said color television signal in opposite phase to each other so that only the lower frequency shifted chrominance signal in said color television signal is cancelled; and*

*g. means for mixing the output of said first separating means with the output of said adding means wherein a standard color television signal is obtained as the output of said mixing means.*

* * * * *